United States Patent [19]
Lacoste-Bourgeacq et al.

[11] Patent Number: 6,083,581
[45] Date of Patent: Jul. 4, 2000

[54] CELLULASE RESISTANT CELLULOSE CASING AND PROCESS

[75] Inventors: Jean-Francois Lacoste-Bourgeacq, Hinsdale; Shiu-Chung Jon, Westmont, both of Ill.

[73] Assignee: Viskase Corporation, Chicago, Ill.

[21] Appl. No.: 08/968,939

[22] Filed: Nov. 12, 1997

[51] Int. Cl.⁷ .......................... B32B 23/08; A22C 13/00
[52] U.S. Cl. .................. 428/34.8; 426/105; 426/135; 427/230; 428/35.2; 428/35.6; 428/35.7; 428/478.4
[58] Field of Search ................... 428/34.8, 35.2, 428/35.6, 35.7, 438, 533, 534; 426/105, 138, 135, 583, 289, 574; 138/118.1; 427/447, 230, 236, 324, 439, 407.1, 412.2, 414, 415, 421, 426

[56] References Cited

U.S. PATENT DOCUMENTS

| | | | |
|---|---|---|---|
| 1,829,702 | 10/1931 | Goodman | 19/325 |
| 2,105,273 | 1/1938 | Smith | 93/82 |
| 2,616,874 | 11/1952 | Yost | 260/70 |
| 2,796,362 | 6/1957 | Wooding et al. | 117/71 |
| 3,158,488 | 11/1964 | Firth | 99/109 |
| 3,360,383 | 12/1967 | Rose et al. | 99/176 |
| 3,367,786 | 2/1968 | Rose | 99/176 |
| 3,378,379 | 4/1968 | Shiner et al. | 99/176 |
| 3,383,223 | 5/1968 | Rose | 99/176 |
| 3,427,169 | 2/1969 | Rose et al. | 99/176 |
| 3,617,312 | 11/1971 | Rose | 99/176 |
| 3,645,760 | 2/1972 | O'Brien et al. | 99/176 |
| 3,674,506 | 7/1972 | Schilling et al. | 99/109 |
| 3,695,904 | 10/1972 | Coleman | 99/176 |
| 3,743,521 | 7/1973 | Rasmussen | 99/176 |
| 3,753,740 | 8/1973 | Turbak et al. | 99/176 |
| 3,905,397 | 9/1975 | Chiu | 426/105 |
| 3,917,894 | 11/1975 | Coleman | 428/414 |
| 3,922,352 | 11/1975 | Tewey et al. | 426/89 |
| 3,935,320 | 1/1976 | Chiu et al. | 426/105 |
| 4,001,442 | 1/1977 | Stahiberger et al. | 426/105 |
| 4,059,706 | 11/1977 | Pischke et al. | 426/548 |
| 4,196,220 | 4/1980 | Chiu et al. | 426/105 |
| 4,348,420 | 9/1982 | Lynch et al. | 426/272 |
| 4,397,337 | 8/1983 | Porrmann et al. | 138/118.1 |
| 4,430,356 | 2/1984 | Ohyabu et al. | 426/574 |
| 4,529,634 | 7/1985 | Hammer et al. | 428/36 |
| 4,555,408 | 11/1985 | Gregor et al. | 426/90 |
| 4,557,801 | 12/1985 | Avis | 162/157.6 |
| 4,662,403 | 5/1987 | Hammer et al. | 138/118.1 |
| 4,666,750 | 5/1987 | Hammer et al. | 428/36 |
| 4,670,273 | 6/1987 | Hammer et al. | 426/105 |
| 4,926,154 | 5/1990 | Keim | 260/29.2 |
| 4,940,615 | 7/1990 | Hammer et al. | 428/34.8 |
| 4,967,798 | 11/1990 | Hammer et al. | 138/118.1 |
| 5,127,953 | 7/1992 | Hamaguchi | 106/504 |
| 5,284,674 | 2/1994 | Fazio | 426/580 |
| 5,389,395 | 2/1995 | Joseph et al. | 426/72 |
| 5,679,536 | 10/1997 | Hayashi et al. | 435/7.9 |
| 5,693,461 | 12/1997 | Bagchi et al. | 430/640 |
| 5,756,680 | 5/1998 | Ahmed et al. | 530/366 |

FOREIGN PATENT DOCUMENTS

| | | |
|---|---|---|
| 247437 | 12/1987 | European Pat. Off. |
| 286026 | 10/1988 | European Pat. Off. |
| 635211 | 1/1995 | European Pat. Off. |
| 1086604 | 10/1967 | United Kingdom |
| 2035842 | 6/1980 | United Kingdom |

OTHER PUBLICATIONS

Hercules Product Data, *Kymene® 557 LX Wet–Strength Resin*, 2 pages, (Hercules Inc. Oct. 1990).

Hercules Product Regulatory Information, *Kymene® 557 L Wet–Strength Resin*, 8 pages, (Hercules Inc. Jul. 22, 1997).

Hermanson, *Bioconjugate Techniques*, p. 142, (Academic Press, Inc., 1996).

Product Specification Beta Fraction, 1 page, (United Milk Tasmania Ltd., Jun. 12, 1993).

"From WPC to WPF at UMT", *Australian Dairy Foods*, pp. 52–53, (Feb. 1994).

"Beta–Fraction, A Multi–Functional Whey Protein Isoiate" 2 page Brochure (Csiro Australia at least as early as 1997).

*Primary Examiner*—Ellis Robinson
*Assistant Examiner*—John J. Figueroa
*Attorney, Agent, or Firm*—Cedric M. Richeson

[57] ABSTRACT

A cellulose food casing and process for making a casing of a tubular cellulosic film having an exterior tube surface and an interior tube surface where the exterior surface is coated with (a) at least one protein having an acidic isoelectric point, preferably β-lactoglobulin and (b) at least one cationic thermosetting resin having epoxy groups, such as a resin which is the reaction product of (a) an epichlorohydrin and (b) at least one polyamide, polyamine, polyamine-polyamide or blends thereof, to provide a casing having improved resistance to degradation e.g by enzymes such as cellulase.

15 Claims, No Drawings

CELLULASE RESISTANT CELLULOSE CASING AND PROCESS

BACKGROUND OF THE INVENTION

The present invention relates to cellulosic films such as sausage casings and processes for making foodstuffs such as sausages using such casings.

Sausages and their manufacture are well known the world over. In the past degradation and weakening of cellulose casing due to hydrolysis of the cellulose by cellulase enzymes produced by naturally occurring molds and bacteria has been a problem in sausage manufacture. Several inventions have been made to minimize or eliminate this hydrolysis e.g. U.S. Pat. No. 3,935,320 (Chiu et al) discloses coating the interior and exterior surfaces of a tubular sausage casing with at least 0.45% by weight of a cured cationic thermosetting resin to provide resistance to enzymatic degradation of the casing. Also, U.S. Pat. No. 4,662,403 (Hammer et al) discloses making casing resistant to mold fungus by coating with glycerol monolaurate and an emulsifier.

Still there is a continuing need for improved casings and processes for making such casings which have improved resistance to cellulase degradation.

SUMMARY OF THE INVENTION

The present invention is useful for making sausages using casings which are resistant to cellulase degradation. The present invention is a cellulose food casing or paper or process for making the same which in all of its embodiments utilizes a coating of a protein having an acidic isoelectric point such as a whey protein, preferably β-lactoglobulin, and a resin which comprises at least one cationic thermosetting resin having epoxy groups, said resin being the reaction product of an epichlorohydrin and at least one polyamide, polyamine, polyamine-polyamide or blends thereof. These materials are believed to be chemically bound to the cellulose of the casing or paper in the invention and such bonded coating imparts resistance to cellulase degradation. The coating may be applied to the cellulosic substrate in multiple solutions or coatings but preferably is applied as an aqueous blend of protein and resin, preferably at an alkaline pH, although application at neutral pH is possible. A preferred embodiment of the invention utilizes a tubular cellulosic film having an exterior tube surface and an interior tube surface wherein said exterior cellulosic surface is chemically bound with the coating. In one embodiment of the invention any of the well known coatings suitable and taught in the art for application to the interior casing surface may be employed such as a coating suitable for meat adhesion and/or peelability. Cationic resins are well known for interior surface application for casings used to make dry sausages. Also it is contemplated by the present invention that a blend comprising (a) at least one protein having an acidic isoelectric point and (b) at least one cationic thermosetting resin having epoxy groups, said resin being the reaction product of an epichlorohydrin and at least one polyamide, polyamine, polyamine-polyamide or blends thereof may also be applied to the interior casing surface as well as the exterior.

DETAILED DESCRIPTION OF THE INVENTION

Sausages are typically made of comminuted meat or meat substitutes which usually are packed into casings for further processing e.g. by cooking, drying smoking. The casing acts as a package which holds the comminuted food together for processing and gives the sausage its characteristic shape.

Natural casings made from animal intestines are edible and elastic. The elasticity permits shrinkage with the encased sausage meat as the sausage drys, and use of these casings slow the loss of moisture from the encased sausage. Natural casings suffer from being fragile, irregular in size and shape making portion control more difficult and high speed automatic stuffing difficult. For these and other reasons casings made from regenerated cellulose, with(fibrous) or without(nonfibrous) a cellulose fiber reinforcement such as paper, have been widely employed in the food industry. Typically such casings, after stuffing and processing, are removed before the sausage is consumed because although cellulose may be eaten without harm, it is difficult to chew, has no taste and is not digested by humans. The cellulose casings for small diameter cooked sausages are typically removed soon after cooking, while large diameter casings may remain on until slicing or just prior to consumption. Removal is usually accomplished by peeling off the casing with or without the assistance of a chemical peeling aid which facilitates detachment of the casing surface from the stuffed food (meat) surface.

In addition to comminuted protein (typically meat), the sausage typically contains added fat, salt, water, curing agents, and flavorants such as spices, herbs, aromatic seeds, dehydrated plants, or other seasonings, Also, many sausages are cured traditionally with various molds and/or bacteria.

Dry sausage is processed by controlled drying to reduce the water content to a point where the sausage environment is inhospitable to harmful bacteria. Well known dry sausages are the salamis and cervelats. The presence of visible mold flora on a sausage surface depends on the type of sausage. For example, Italian and Hungarian salamis have a mold surface coating of white or grey color which is an expected and desired characteristic. These molds serve four functions in the aging process; (1) regulation of moisture loss; (2) pH regulation; (3) providing characteristic flavor and aroma development due mainly to lipases; and (4) providing the color and final appearance of the sausage surface.

In dry sausage production, typically, sausage ingredients are chopped, blended and then stuffed into casings whereafter the encased sausage may be optionally smoked and/or cooked, after which it is dried. Prior to drying, the sausages may be placed in a "green room" where the temperature and humidity are carefully controlled to begin proper drying. For final drying, sausages are transferred to a final drying room which typically has temperature and humidity controls. The sausages are typically hung in the drying room and their position may be changed over time to modify the drying conditions. Drying conditions are carefully monitored. Sausages should dry from the inside out. Sausages which are dried too quickly may detrimentally harden the sausage surface which can trap moisture inside the sausage leading to interior mold development, souring and spoilage. Controlled conditions also avoid drying too slowly which can lead to a slimy surface on the sausage which also promotes conditions leading to a sour or spoiled product. In the drying room, some manufacturers permit an ambient surface mold to grow or may inoculate the surface with a particular mold strain to produce some traditional varieties of sausage.

Disadvantageously, cellulose casings may be weakened by hydrolysis from cellulases. This weakening may be exacerbated by salt water brushing of the casing surface which is typically done periodically to control the mold layer thickness and homogeneity. This brushing or washing of the encased sausage can result in casing breakage causing the sausage to fall to the floor of the drying room if hung vertically by casing ties. It may also cause the casing to fragment and detach in flakes leaving a poor surface appearance of the sausage. All of these casing problems can result in production rejects. Also, a loss of integrity of the casing (which causes the casing to flake and come off in pieces instead of peeling off as a single piece or in large continuous sections) may cause peeling of the casings in the plant prior to slicing to be undesirably time-consuming.

The present invention uses a special coating on the exterior surface of a tubular cellulosic casing to inhibit an enzyme family called cellulase which catalyzes degradation of cellulose chains to lower the molecular weight and chain lengths of the cellulose. Various cellulases are naturally associated with molds found in commercial food production. These include (but are not limited to) cellulases from molds such as *Penicillium nalgiovensis, Aspergillus niger* and *Penicillium funiculosum.*

The present invention permits use of cellulose casings such as fiber-reinforced(fibrous) and nonfiber-reinforced (nonfibrous) casings for dry sausages which may be subjected to conditions which are conducive to mold growth. Typically casings which are reinforced with a paper web are used for dry sausage production and are termed fibrous casings, although the invention applies as well to nonfibrous casings.

Cellulose films in sheet or tubular form as well as cellulose sausage casings produced, for example, by the viscose process, the N-methyl morpholine oxide (NMMO) process, the denitration of cellulose nitrate or the de-esterification of other cellulose esters and the cellulose carbamate process can also be coated and treated according to the methods of this invention. Other cellulosic materials, such as papers or cellulose ethers, like hydroxyethyl cellulose can also be similarly coated and treated. The use of a cellulosic casing having a fibrous web embedded therein is preferred. A fibrous web formed of hemp fibers bonded together with regenerated cellulose is preferred as the fibrous base paper and such webs are commercially available and are known in the art as casing papers. Other nonwoven webs, such as Yoshino paper, rice paper, hemp, rayon, cotton and nylon; and woven fabrics such as muslin, marquisette, cheesecloth, organdy and viole can be used.

It should be understood that these fibrous webs are commercially obtainable. In this embodiment of the present invention, it should be further understood that these fibrous webs can be either untreated or treated in accordance with the methods of this invention as described in greater detail hereinbelow. Fibrous and nonfibrous cellulose casings and papers are well known in the art and commercially available in a wide variety of dimensions and styles. The methods for their manufacture are also well known in the art and extensively described in the patent literature.

The invention in all of its embodiments utilizes an exterior coating of a protein having an acidic isoelectric point, such as a whey protein fraction in combination with a cationic resin having epoxy groups and this coating is chemically bonded to the cellulose of the casing or paper. This coating may optionally also be applied to the interior casing surface.

The protein required by the invention comprises at least one protein having an acidic isoelectric point such as whey protein (including synthetic equivalents), and preferably β-lactoglobulin. Advantageously the proteins used may be water-soluble or salt water-soluble protein thereby facilitating the coating process by allowing the protein to be dissolved in an aqueous solution. Whey proteins include alpha-lactalbumin and beta-lactoglobulin. β-lactoglobulin is available from United Milk Tasmania Ltd. in Australia under the trademark Beta-Fraction™. Whey protein is also available under the trademark Daritek™ NBV from Foremost Products of Wisconsin, U.S.A.

The resin required by the invention comprises the reaction product of: epichlorohydrin with polyamine, polyamide or polyamine-polyamide or blends thereof A preferred resin is a reaction product of epichlorohydrin and polyamide such as that available under the trademark Kymene® 557 LX from Hercules Incorporated of Wilmington, Del., U.S.A. Blends with additional cationic resins or crosslinking agents may also be used.

The crosslinking thermosetting resin can be cured to an insoluble state. Examples of water soluble or water dispersible cationic thermosetting resins that can be used are those selected from the group of resins consisting of the reaction products of an epichlorohydrin and polyamide, polyamine, polyamine-polyamide or blends. Additionally, polyalkylenepolyamines and/or their salts, which include such polyamines as diethylenetriamine, triethylenetetramine, tetraethylenepentamine and the corresponding polypropylenepolyamines, as well as 4,4'-iminobisbutylamine, and 3,3',3"-nitrilotrispropylamine can also be employed.

The higher polyalkylenepolyamines can also be used including polyethylenimine (formed by homopolymerization of ethyleneimine), the long chain polyalkylenepolyamines formed by reacting a simple alkylenediamine or a simple polyalkylenepolyamine with about 0.6–1.5 mols of an alkylene dichloride, an alkylene dichlorohydrin or epichlorohydrin.

A method of preparing the epichlorohydrin-polyamine compositions is described in U.S. Pat. No. 2,926,154. Additional cationic or crosslinking agents may be employed, for example, melamine-formaldehyde or urea-formaldehyde resins. A method of preparing cationic melamine-formaldehyde thermosetting resin compositions is described in U.S. Pat. No. 2,796,362. A detailed method of preparing urea-formaldehyde thermosetting resins is described in U.S. Pat. No. 2,616,874.

The protein and resin containing aqueous coating solutions may be applied at various solution pHs. Buffered solutions and solutions of neutral and alkaline pHs may be used. A slight advantage in facilitating chemical bonding of the coating materials to the cellulose is believed to be achieved using an alkaline pH such as a pH of at least 8, preferably about 9.

As mentioned hereinabove and set forth in examples, regenerated cellulosic casings having a paper web embedded therein (fibrous casings) can also be used in the practice of this invention. The paper webs used in making fibrous casings may be commercially formed on conventional paper making machines wherein long hemp fibers are beat into a slurry and then formed into webs and dried. The paper web is then passed through or contacted with a dilute cellulose or cellulose derivative solution such as viscose and again dried whereupon the cellulosic composition is solidified and/or partially regenerated. In a suitable viscose process, the cellulose in the viscose is further regenerated by passing the paper web through dilute acid solutions and a washing solution. The paper web is dried and cut into unit widths from a master roll for food casing manufacture.

Suitable cellulase resistant coating amounts may be determined without undue experimentation depending e.g. upon such variables as the degree or length of time of protection desired and cost of coating materials. For a typical application of the invention it is expected that 1% or less by weight of total coating relative to the weight of the casing may be advantageously employed, although larger amounts may also be used.

It is contemplated that the coatings may be applied to the casing at various points in the casing or paper manufacturing process. For example in casings made by the well known viscose process the coatings may be added to gel stock casing before or after the well known glycerine treatment or in place of any glycerine treatment with subsequent drying. Such coating may also be applied after drying to flat stock cellulose casing or paper or to a tube thereof before reeling or shirring according to any of the well known techniques in the art for applying coatings to casings or papers. In addition the coatings may be applied serially or together in a single solution using varying coating amounts and residence times. Parameters of time, temperature, pressure, and coating amounts may vary depending upon such variables as cost and time considerations, desired degree of protection, variation in casing substrate attributes, available equipment, etc. Suitable combinations of parameters may be obtained without undue experimentation to achieve the aims of the present invention being well within the skill of the art in light of the present disclosure.

The following examples including comparative examples are given to illustrate the present invention.

Experimental results of the following examples are based on tests similar to the following test methods unless noted otherwise.

As used herein, all tensile strengths and % elongations at break are measured "wet" which is usually a more stringent test than "dry" tests. For these measurements, the casing samples are soaked in an aqueous solution for at least 15 minutes before the tensile strength measurement. The test is performed on an Instron Table Model Tensile Testing Machine (or equivalent) of the constant rate-of-jaw separation type using a method derived from ASTM D-882. The specific procedure is as follows:

1) Cut three samples 2 inches long in the transverse direction (TD)×1 inch wide in the machine direction (MD).
2) Set the Testing Machine crosshead speed and the chart speed at 20 inches/minute.
3) Set the gauge length (jaw distance) at 1 inch and zero the pen.
4) Clamp the specimen squarely between the jaws.
5) Run the crosshead down until the specimen ruptures.
6) Record the tensile strength at break in lbs/inch$^2$ and plot % elongation on graph.
7) Calculate the arithmetic average of three tensile strength readings and % elongation at break values. These tensile and elongation averages are the values reported hereinafter in the Tables.

The above description and below examples are given to illustrate the invention and methods of making the invention, but these examples should not be take as limiting the scope of the invention to the particular embodiments or parameters demonstrated since modifications of these teachings will be apparent to those skilled in the art.

EXAMPLES 1–6

A series of casings were tested to determine resistance to degradation by cellulase enzyme. These casings were tested for tensile strength and % elongation at break and the results are reported in Table 1. Examples 1, 2, and 4–6 all utilized a fiber-reinforced cellulose casing of the type commercially available from Viskase Corporation, Chicago, Ill., U.S.A. and had a casing thickness of about 3.0 mils (76 μm). Example 1 is a control example of casing without any cellulase treatment. Three one inch (2.54 cm) wide by 2 inch long strips of casing were cut from the casing with the long dimension of the strip extending in the machine (longitudinal) direction of the casing. The casing strips of Example 1 were soaked for about 15 minutes in deionized water and then, while the strips were still wet, the tensile strength and % elongation were measured in the machine direction for each strip with an Instron test machine. The values were averaged and reported in Table 1.

Example 2, a control example, is a sample of casing similar to that of Example 1, but instead of soaking in deionized water, the casing strips were treated for 24 hours with an enzyme solution. The enzyme solution is made by dissolving 1% by weight cellulase (Sigma brand cellulase EC3.2.1.4 from *Aspergillus niger*)powder in a buffered (pH 5.0) (Fisher solution SB102-1) aqueous solution. For Example 2, the three strips are placed into a glass container having the 1% cellulase solution. The strips were soaked in this solution, which is kept at 35° C. in a heated temperature controlled water bath. After about 24 hours, the strips were then removed and washed three times in a liter of deionized water(using fresh deionized water for each of the three rinses). The washed strips were then tested as for Example 1, and the averaged results are reported in Table 1.

Example 3 is another control example. It is a collagen casing made of inedible collagen and was commercially available from Fibran. Three similarly sized samples were cut into strips as for Example 2 and the strips were soaked for about 15 minutes in a 20% salt solution and thereafter treated with the cellulase solution, with subsequent rinsing and testing as for Example 2. The collagen casing strips had a thickness of about 3.5 mils (89 μm). The results are reported as an average of the three values in Table 1.

Example 4 is a comparative example which was prepared and tested as for Example 2, except that prior to soaking in the cellulase solution, the fiber-reinforced cellulose casing was cut open into a sheet and placed into an embroidery type hoop and then washed in warm tap water for about 10 minutes to remove water soluble components or coatings such as glycerin and then dipped into about 1 liter of an aqueous solution of 14.4% by weight of Kymeneg® 557 LX resin for 5 minutes with mild stirring. The casing was then removed from the solution and heated until dry (for about one to eight minutes in an oven at 80° C.). This procedure is believed to couple the resin to the cellulose by forming chemical bonds. The resin coated casing was then cut into 1 inch by 2 inch as for Example 1 and these coated strips were treated with the enzyme solution and tested as for Example 2.

Example 5 was conducted as for Example 4 except that after the casing was removed from the Kymeneg® 557 LX resin solution and before heating, the casing was placed for 5 minutes with mild stirring into an aqueous solution of 10 weight % egg white protein fraction P110 (available from Henningsen Foods, Inc. of Omaha, Neb., U.S.A.). The protein solution was made by dissolving the protein in deionized water at neutral pH (7.0).

Example 6 was conducted as for Example 5 except that an aqueous solution of 10 weight % beta-lactoglobulin protein fraction (available from United Milk Tasmania Ltd.) was used instead of the egg white protein solution.

The results of the tests are reported in Table 1.

TABLE 1

| Example No | Type of Casing & Coating | Treated with 1% cellulase | Wet Tensile Strength at RT lb/in² (Pa) | % Elongation At Break |
|---|---|---|---|---|
| 1 | Fibrous Casing No Coating | No | 27 | 35 |
| 2 | Fibrous Casing No Coating | ✓ | 9 | 13 |
| 3 | Collagen No coating | ✓ | 6 | 28 |
| 4 | Fibrous Casing with Kymene ® 557 LX | ✓ | 12 | 16 |
| 5 | Fibrous Casing with 557 + 10% Egg White Protein | ✓ | 12 | 14 |
| 6 | Fibrous Casing with 557 + 10% β-lactoglobulin | ✓ | 12 | 32 |

RT = Room Temperature
✓ = Yes

The results in Table 1 demonstrate that cellulase treatment causes a lessening in wet tensile strength of fiber-reinforced casing and a reduction in the % elongation at break. Example 1 shows a breaking point wet tensile strength of 27 lb per square inch. All cellulase treated casings of the examples show a deterioration in strength although all resin coated casings (Examples 4–6 show increased resistance to loss of tensile strength). Collagen casing has found great acceptance for dry sausage application notwithstanding low wet tensile strength but as seen in Table 1, the collagen casing of Example 3 demonstrates excellent high % elongation at break values which indicate resistance to the undesirable effects of cellulase upon the casing. All other cellulase treated casing examples, except Example 6, show greatly lower % elongation values indicating weakened casings which are more susceptible to loss of integrity and attendant problems including casing peeling problems and breakage during smokehouse hanging. Surprisingly, the cellulose casing of Example 6 which was coated with a combination of resin and β-lactoglobulin maintained a very high and excellent % elongation at break value which was superior not only to all other cellulase treated cellulose casings but also superior to collagen casing.

Another series of casings were tested to review the effect of pH on the coupling mechanism of the coating to cellulose. It is believed, without wishing to be bound by the belief, that the process of the present invention causes the covalent immobilization of the protein to the cellulose through the epichlorohydrin resin anchorage and the creation of secondary amine bonds thereby increasing the integrity of the casing and ameliorating problems associated with cellulase attack by molds.

Examples 7–14 were prepared and tested similar to Examples 1–6, except a single aqueous solution containing a blend of resin and protein was used and the pH of the Kymene® 557 LX resin and protein solution was adjusted to a pH of 9 with NaOH for Examples 11 and 12.

Control and comparative Examples 7–10 were prepared as for previous Examples 1–4. Example 11 was prepared similar to Example 5, except a mixed resin and protein solution was adjusted to pH 9 before coating the casing. Example 12 was similar to Example 6, except the resin and protein solution had been adjusted to pH 9 before coating the casing. After coating for about 5 minutes and drying, the casings of Examples 11 and 12 were cut into strips as for Example 10. Examples 13 and 14 were not prepared and tested at the same time as Examples 7–12, but are included as additional comparisons of casings prepared using pH 7 solutions. Examples 13 and 14 were prepared and tested similar to Examples 5 and 6, except for these two examples the resin and protein coating step was as follows. The hooped casings were first soaked for one minute in a 14.4 wt. % aqueous solution of Kymene 557 LX directly followed by soaking for 5 minutes in a blended protein and resin solution and then the coated casing was dried and further treated as above. For Example 13, the 5 minute soak was in an aqueous solution of 10% by weight egg white protein and 14.4% by weight of 557 LX resin. For Example 14, the 5 minute soak was in an aqueous solution of 10% by weight β-lactoglobulin protein and 14.4 % by weight of 557 LX resin. All of the examples 7–14 were tested for wet tensile strength and % elongation at break and the results are reported in Table 2.

TABLE 2

| Example No | Type of Casing & Coating | pH | Treated with 1% cellulase | Wet Tensile Strength at RT lb/in² (Pa) | % Elongation At Break |
|---|---|---|---|---|---|
| 7 | Fibrous Casing No Coating | 7 | No | 26 | 35 |
| 8 | Fibrous Casing No Coating | 7 | ✓ | 7 | 13 |
| 9 | Collagen No Coating | 7 | ✓ | 8 | 31 |
| 10 | Fibrous Casing with Kymene ® 557 LX | 7 | ✓ | 16 | 17 |
| 11 | Fibrous Casing with 557 + 10% Egg White Protein | 9 | ✓ | 20 | 20 |
| 12 | Fibrous Casing with 557 + 10% β-lactoglobulin | 9 | ✓ | 25 | 28 |
| 13 | Fibrous Casing with 557 + 10% Egg White Protein | 7 | ✓ | 16 | 20 |
| 14 | Fibrous Casing with 557 + 10% β-lactoglobulin | 7 | ✓ | 23 | 28 |

RT = Room Temperature
✓ = Yes

The results in Table 2 demonstrate that increasing the pH of the resin and protein solutions(Examples 11 and 12) may possibly lead to slight improvements (relative to Examples 13 and 14) in wet tensile strength, but has no apparent effect on % elongation. Examples 12 and 14 both show significant increases in wet tensile strength over the comparative example 10 which had only a resin coating without a protein coating treatment. This series of tests show improved performance for casing using the immobilization of whey protein β-lactoglobulin in one step over use of a resin coating alone for the inventive coatings applied at both pH 7 and pH 9. For egg white protein, improvement in wet tensile strength was seen for the coatings applied at pH 9 but not the pH 7 coating casings. Again the resin and β-lactoglobulin coated cellulose casings show surprisingly good % elongation at break values as well as improved wet tensile strength relative to both uncoated fibrous casing and resin only-coated fibrous casing. The % elongation values for the inventive casing of Examples 12 and 14 are unexpectedly higher and very close in values to the collagen casing of comparative Example 9. The high % elongation at break values and wet tensile strength for the inventive casings are indicative of improved cellulose casing integrity which is expected to beneficially make peeling easier and reduce casing breakage in drying room hanging relative to uncoated cellulose coating and cellulose casing coated with resin alone.

Another series of casings were prepared and tested to determine the effect of changing various variables in making casing of the present invention. Variables examined include substituting a nonfibrous regenerated cellulose casing for fiber-reinforced casing, comparing whey protein fractions from two sources, glycerinated versus nonglycerinated casings; and mixed resin and protein solution application versus sequential application of resin and protein. Examples 15–35 are further described in Table 3 and the casings of the examples and their treatment and testing were similar to the above examples except as otherwise noted. Values reported are an average for three strips tested for each casing.

Example 15 is a control casing made of inedible collagen which is commercially available from Fibran. The dry casing wall thickness is about 2.6 mil (66 μm). This collagen casing was soaked for about 5 minutes in an aqueous solution of 20 wt. % salt prior to testing.

Examples 16–29 were all fiber-reinforced cellulose casings having a dry wall thickness of about 3.0 mil (76 μm). Examples 30–35 were large size (about 230 mm circumference) nonfibrous regenerated cellulose casings having a casing wall thickness of about 5.3 mils (135 μm).

The examples which were treated with cellulase were soaked, as for previous examples, at about 35° C. for 24 hours in an aqueous solution of 1 weight % cellulase. The glycerinated casings omitted the casing washing step in warm tap water that was utilized to remove glycerine prior to applying any resin or protein coatings for the examples designating no glycerin. The "no glycerin" examples may contain a trace amount of glycerin due to incomplete washing. Of Examples 16–35, the casings of Examples 17, 24–29, 31, 34, and 35 used a tap water washing step to remove water-soluble coatings including glycerine whereas the remaining Examples did not have the extra step to remove glycerin, although some glycerin may have been removed during the resin, protein or enzyme coating steps or during the about 15 minute water soak step used prior to testing for the casings that were not treated with the aqueous cellulase solution.

The casings of Examples 18–29 and 32–35 were coated with at least one aqueous solution containing resin and/or protein. In the Table 3, "resin" refers to an aqueous solution of 14.4% by weight Kymene™ 557 LX which is a cationic thermosetting resin having epoxy groups formed by the reaction product of epichlorohydrin and polyamine, polyamide or polyaminepolyamide or blends thereof. The term "β-lactoglobulin" or "β" is used in the Table 3 to refer to an aqueous solution of 10% by weight β-lactoglobulin protein fraction from United Milk Tasmania Ltd. under the trademark Beta-Fraction. The term "whey protein" or "WP" is used in Table 3 to refer to an aqueous solution of 10% by weight of a whey protein fraction containing β-lactoglobulin which was available from Foremost Products under the trademark Daritek NBV.

In Examples 18, 19, 22–25, 28, and 29, the coating of resin and/or protein was applied in a single step by soaking in a single solution with mild mixing for a period of about 5 minutes at ambient conditions at the indicated solution pH. The sequentially coated casing Examples 20, 21, 26, 27, and 32–35, were all coated first with the Kymene 557 LX resin solution for about I minute followed immediately with soaking in the protein solution for about 5 minutes with mild stirring.

For each Example, both cellulase treated and untreated, similar casing strips were tested for elongation at break and wet tensile strength. The results are reported in Table 3 below.

TABLE 3

| | | | | | No Cellulase Treatment | | Cellulase Treated | |
|---|---|---|---|---|---|---|---|---|
| Ex. No. | Casing Type | Glycerin | Coating Type | Coating Solution pH | Wet Tensile Strength at RT lb/in² (Pa) | Elongation At Break % | Wet Tensile Strength at RT lb/in² (Pa) | Elongation At Break % |
| 15 | COLLAGEN | NO | NONE | — | 7 | 39 | 4 | 31 |
| 16 | FIBER-REINFORCED CELLULOSE | YES | NONE | — | 21 | 42 | 4 | 7 |
| 17 | FIBER-REINFORCED CELLULOSE | NO | NONE | — | 26 | 43 | 7 | 12 |
| 18 | FIBER-REINFORCED CELLULOSE | YES | 10% β-LACTO-GLOBULIN (β) | 9 | 27 | 36 | 9 | 12 |
| 19 | FIBER-REINFORCED CELLULOSE | YES | 10% WHEY PROTEIN (WP) | 9 | 29 | 36 | 10 | 14 |
| 20 | FIBER-REINFORCED CELLULOSE | YES | RESIN + β (SEQUENTIAL) | 9 | 29 | 37 | 14 | 17 |
| 21 | FIBER-REINFORCED CELLULOSE | YES | RESIN + WP (SEQUENTIAL) | 9 | 30 | 38 | 12 | 15 |
| 22 | FIBER-REINFORCED CELLULOSE | YES | (RESIN + β) (BLEND) | 9 | 29 | 37 | 16 | 19 |
| 23 | FIBER-REINFORCED CELLULOSE | YES | (RESIN + WP) (BLEND) | 9 | 29 | 36 | 16 | 16 |
| 24 | FIBER-REINFORCED CELLULOSE | NO | 10% β-LACTO-GLOBULIN (β) | 9 | 27 | 39 | 8 | 12 |
| 25 | FIBER-REINFORCED CELLULOSE | NO | 10% WHEY PROTEIN (WP) | 9 | 27 | 38 | 8 | 10 |
| 26 | FIBER-REINFORCED CELLULOSE | NO | RESIN + β (SEQUENTIAL) | 9 | 27 | 44 | 11 | 14 |
| 27 | FIBER-REINFORCED CELLULOSE | NO | RESIN + WP (SEQUENTIAL) | 9 | 27 | 37 | 11 | 13 |
| 28 | FIBER-REINFORCED CELLULOSE | NO | (RESIN + β) (BLEND) | 9 | 29 | 35 | 23 | 20 |
| 29 | FIBER-REINFORCED CELLULOSE | NO | (RESIN + WP) (BLEND) | 9 | 30 | 33 | 17 | 16 |

TABLE 3-continued

| | | | | | No Cellulase Treatment | | Cellulase Treated | |
|---|---|---|---|---|---|---|---|---|
| Ex. No. | Casing Type | Glycerin | Coating Type | Coating Solution pH | Wet Tensile Strength at RT lb/in$^2$ (Pa) | Elongation At Break % | Wet Tensile Strength at RT lb/in$^2$ (Pa) | Elongation At Break % |
| 30 | NON-FIBROUS CELLULOSE | YES | NONE | — | 26 | 35 | 14 | 16 |
| 31 | NON-FIBROUS CELLULOSE | NO | NONE | — | 25 | 35 | 22 | 29 |
| 32 | NON-FIBROUS CELLULOSE | YES | RESIN + β (SEQUENTIAL) | 9 | 30 | 36 | 29 | 35 |
| 33 | NON-FIBROUS CELLULOSE | YES | RESIN + WP (SEQUENTIAL) | 9 | 29 | 35 | 29 | 32 |
| 34 | NON-FIBROUS CELLULOSE | NO | RESIN + β (SEQUENTIAL) | 9 | 29 | 39 | 26 | 33 |
| 35 | NON-FIBROUS CELLULOSE | NO | RESIN + WP (SEQUENTIAL) | 9 | 28 | 35 | 26 | 32 |

Referring to Table 3, tests were conducted on samples of fibrous casing, with and without a glycerin removal wash, and using whey protein fractions from two different suppliers. The effect of cellulase degradation is clearly seen in the lower tensile strength and elongation at break values of examples 16–19, 24, and 25 relative to the same casings without cellulase treatment.

A protein treatment alone approximately doubled the wet tensile strength and elongation at break values of the glycerinated (no wash step) fibrous casings (Examples 18 and 19) relative to the glycerinated fibrous control casing of Example 16. An improvement was also seen for the control fibrous casing of Example 17 which had a glycerin removal wash step over the control fibrous casing of Example 16. There was no added improvement exhibited by the protein only coated washed fibrous casings of Examples 24 and 25 relative to the washed control Example 17.

The glycerinated fibrous casing Examples 20–21 also show a further improvement of the casings which used a sequential coating of resin solution followed by protein solution over the samples containing whey protein alone. The glycerinated fibrous casing Examples 22–23 which utilized a coating of a blend of resin and protein show a further improvement of the casings over the sequential coating of a resin solution followed by a protein solution.

Further review of the washed fibrous casing Examples 26–27 show a further but modest improvement of the casings which used a sequential coating of resin solution followed by protein solution over the samples containing whey protein alone. The washed fibrous casings of Examples 28–29 which utilized a coating of a blend of resin and protein show a much greater improvement of the casings over the sequential coating of resin solution followed by protein solution.

Referring again to Table 3, tests were conducted on samples of nonfibrous casing, with and without a glycerin removal wash, and using whey protein fractions from two different suppliers. The effect of cellulase degradation is seen in the lower tensile strength and elongation at break values of examples 30 and 31 relative to the same casings without cellulase treatment. The degradation difference reflected in the differing values between the nonfibrous casings (about 5.3 mils) of Examples 30 and 31 relative to the fibrous casings (about 3.0 mils) of Examples 16 and 17 is believed due in part to the difference in thicknesses of the casings.

An improvement was seen for the control nonfibrous casing of Example 3I which had a glycerin removal wash step over the control nonfibrous casing of Example 30. A further improvement was seen for both the glycerinated and washed nonfibrous casing which were coated with resin and protein.

Both the proteins from United Milk Tasmania Ltd. and from Foremost were effective in the inventive formulations. The above examples and test results demonstrate the suitability and improved performance of the inventive casings for use in cellulase resistant applications such as for dry sausage production.

The above examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A cellulase resistant cellulose sausage casing comprising:
   a tubular cellulosic film having an exterior tube surface and an interior tube surface wherein said exterior cellulosic surface is chemically bound with a coating of a blend comprising (a) at least one protein selected from the group consisting of whey protein and β-lactoglobulin, and (b) at least one cationic thermosetting resin having epoxy groups, said resin being the reaction product of: an epichlorohydrin and at least one polyamide, polyamine, polyamine-polyamide or blends thereof.

2. A casing, as defined in claim 1, wherein said protein comprises a whey protein.

3. A casing, as defined in claim 1, wherein said protein comprises a β-lactoglobulin.

4. A casing, as defined in claim 1, wherein said casing comprises a fiber-reinforced cellulose casing.

5. A casing, as defined in claim 1, wherein said casing comprises a nonfibrous cellulose casing.

6. A casing, as defined in claim 1, wherein said coating is on both said exterior and said interior surfaces of said casing.

7. A process for making a cellulosic sausage casing comprising:
   coating a cellulosic casing with a blend comprising (a) at least one protein selected from the group consisting of whey protein and β-lactoglobulin, and (b) at least one cationic thermosetting resin having epoxy groups, said resin being the reaction product of: an epichlorohydrin and at least polyamide, polyamine, polyamine-polyamide or blends thereof.

8. A process, as defined in claim 7, wherein said coating is applied at an alkaline pH.

9. A process for making a cellusase resistant cellulosic sausage casing comprising:

coating a cellulosic casing with at least one cationic thermosetting resin having epoxy groups, said resin comprising the reaction product of an epichlorohydrin and at least one polyamide, polyamine, polyamine-polyamide or blends thereof, and then subsequently coating said casing with a coating of whey protein or β-lactoglobulin.

10. A process, as defined in claim 9, wherein said coatings are applied at an alkaline pH.

11. A cellulase resistant cellulosic polyamide sausage package comprising:

a cellulosic paper or film having an exterior surface and an interior surface and which is chemically bonded on at least one of said surfaces with a coating comprising (a) at least one protein selected from the group consisting of whey protein and β-lactoglobulin, and (b) at least one cationic thermosetting resin having epoxy groups, said resin being the reaction product of an epichlorohydrin and at least one polyamide, polyamine, polyamine-polyamide or blends thereof.

12. A package, as defined in claim 11, wherein said coating is bonded to said exterior surface.

13. A package, as defined in claim 11, wherein said coating is bonded to both said exterior and said interior surfaces.

14. A package, as defined in claim 11, wherein said coating has a pH greater than 8.

15. A package, as defined in claim 11, wherein said casing has said coating on said exterior surface and on said interior surface has a coating comprising at least one cationic thermosetting resin having epoxy groups, said resin comprising the reaction product of: an epichlorohydrin and at least one polyamide, polyamine, polyamine-polyamide or blends thereof.

* * * * *